(12) United States Patent
Kurosu et al.

(10) Patent No.: US 11,626,248 B2
(45) Date of Patent: Apr. 11, 2023

(54) MULTILAYER CERAMIC CAPACITOR

(71) Applicant: Murata Manufacturing Co., Ltd., Nagaokakyo (JP)

(72) Inventors: Yuta Kurosu, Nagaokakyo (JP); Masahiro Wakashima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/925,350

(22) Filed: Jul. 10, 2020

(65) Prior Publication Data

US 2021/0020377 A1 Jan. 21, 2021

(30) Foreign Application Priority Data

Jul. 16, 2019 (JP) .............................. JP2019-131514

(51) Int. Cl.
*H01G 4/30* (2006.01)
*H01G 2/06* (2006.01)
*H01G 4/12* (2006.01)
*H01G 4/012* (2006.01)
*H01G 4/008* (2006.01)

(52) U.S. Cl.
CPC ............... *H01G 4/30* (2013.01); *H01G 2/065* (2013.01); *H01G 4/008* (2013.01); *H01G 4/012* (2013.01); *H01G 4/12* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/224; H01G 2/065; H01G 4/008; H01G 4/1218
See application file for complete search history.

(56) References Cited

U.S. PATENT DOCUMENTS

| | | | |
|---|---|---|---|
| 6,496,355 B1 | 12/2002 | Galvagni et al. | |
| 9,786,434 B2 * | 10/2017 | Choi | H01G 4/30 |
| 10,366,834 B1 * | 7/2019 | Lee | H01G 4/248 |
| 10,770,232 B2 * | 9/2020 | Han | H01G 4/232 |

(Continued)

FOREIGN PATENT DOCUMENTS

| | | |
|---|---|---|
| CN | 104616887 A | 5/2015 |
| CN | 108735507 A | 11/2018 |

(Continued)

OTHER PUBLICATIONS

Official Communication issued in corresponding Korean Patent Application No. 10-2020-0082803, dated Jul. 20, 2021.

(Continued)

*Primary Examiner* — Michael P McFadden
(74) *Attorney, Agent, or Firm* — Keating & Bennett, LLP

(57) ABSTRACT

A multilayer ceramic capacitor includes a ceramic multilayer body including ceramic layers and internal electrodes that are layered, main surfaces, side surfaces, and end surfaces, a conductor layer covering each of the end surfaces of the ceramic multilayer body and electrically connected to the internal electrodes, an insulating layer covering the conductor layer, and an external electrode electrically connected to the conductor layer. The conductor layer includes a portion that extends to a portion of each of the main surfaces of the ceramic multilayer body.

20 Claims, 11 Drawing Sheets

(56) References Cited

U.S. PATENT DOCUMENTS

| | | | |
|---|---|---|---|
| 2010/0290172 A1* | 11/2010 | Motoki | H01G 4/2325 427/79 |
| 2015/0022945 A1 | 1/2015 | Park et al. | |
| 2015/0084487 A1* | 3/2015 | Mori | H01G 4/232 336/200 |
| 2015/0124370 A1* | 5/2015 | Ahn | H01G 4/12 361/272 |
| 2015/0318111 A1* | 11/2015 | Lee | H01G 4/2325 29/25.03 |
| 2017/0164479 A1* | 6/2017 | Park | H01G 2/065 |
| 2017/0256359 A1* | 9/2017 | Masunari | H01G 4/005 |
| 2017/0278634 A1 | 9/2017 | Kato | |
| 2018/0082785 A1* | 3/2018 | Asano | H01G 4/232 |
| 2018/0082788 A1* | 3/2018 | Asano | H01G 4/232 |
| 2018/0301281 A1 | 10/2018 | Park et al. | |
| 2019/0131076 A1* | 5/2019 | Fukumura | H01G 4/232 |
| 2019/0385795 A1* | 12/2019 | Yang | H01G 4/30 |
| 2021/0082622 A1* | 3/2021 | Kim | H01G 4/30 |

FOREIGN PATENT DOCUMENTS

| | | |
|---|---|---|
| JP | 2003124062 A | 4/2003 |
| JP | 2015023272 A | 2/2015 |
| JP | 2015-090977 A | 5/2015 |
| JP | 2017-175037 A | 9/2017 |
| KR | 10-2015-0051667 A | 5/2015 |
| KR | 10-2017-0113108 A | 10/2017 |
| KR | 10-2018-0115595 A | 10/2018 |
| KR | 10-2019-0049479 A | 5/2019 |

OTHER PUBLICATIONS

Official Communication issued in corresponding Chinese Patent Application No. 202010677647.3, dated Oct. 9, 2021.
Official Communication issued in corresponding Japanese Patent Application No. 2019-131514, dated Apr. 6, 2022.
Office Action in JP2019-131514, dated Oct. 18, 2022, 5 pages.

* cited by examiner

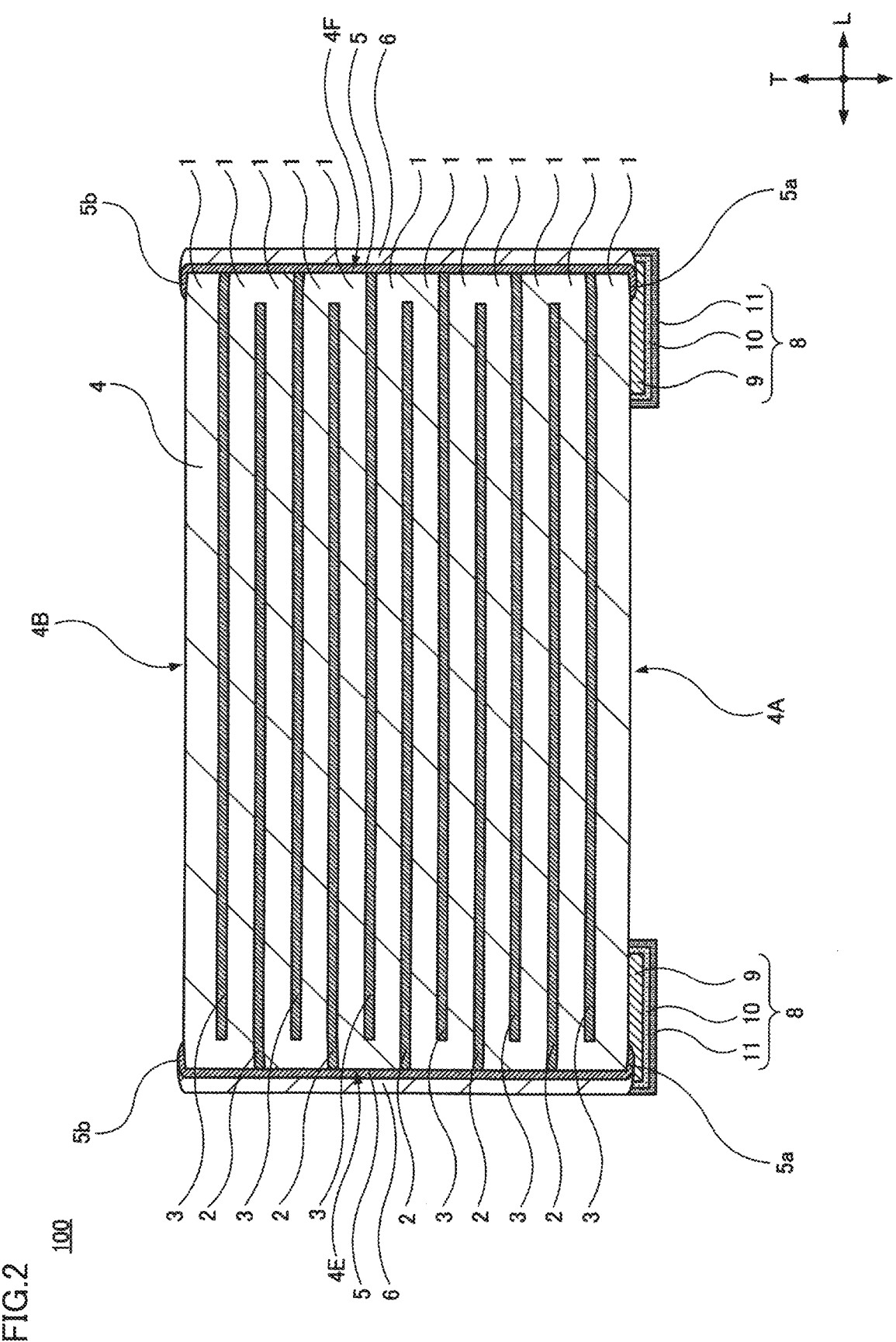

MULTILAYER CERAMIC CAPACITOR

CROSS REFERENCE TO RELATED APPLICATIONS

This application claims the benefit of priority to Japanese Patent Application No. 2019-131514 filed on Jul. 16, 2019. The entire contents of this application are hereby incorporated herein by reference.

BACKGROUND OF THE INVENTION

1. Field of the Invention

The present invention relates to a multilayer ceramic capacitor and, more specifically, to a multilayer ceramic capacitor in which a conductor layer covers an end surface of a ceramic multilayer body and an insulating layer covers the conductor layer.

2. Description of the Related Art

Japanese Patent Laid-Open No. 2017-175037 discloses a multilayer ceramic capacitor in which a conductor layer is formed to cover an end surface of a ceramic multilayer body and an insulating layer is formed to cover the conductor layer. The multilayer ceramic capacitor disclosed in Japanese Patent Laid-Open No. 2017-175037 achieves improved moisture resistance by covering the end surface of the ceramic multilayer body to which an internal electrode is drawn with two layers of the conductor layer and the insulating layer. FIG. 11 shows a multilayer ceramic capacitor 1000 disclosed in Japanese Patent Laid-Open No. 2017-175037. FIG. 11 is a cross-sectional view of multilayer ceramic capacitor 1000.

Multilayer ceramic capacitor 1000 includes a ceramic multilayer body 103 including a plurality of ceramic layers 101 and a plurality of internal electrodes 102 that are layered. Some of internal electrodes 102 are drawn to one end surface of ceramic multilayer body 103 and remaining internal electrodes 102 are drawn to the other end surface of ceramic multilayer body 103.

On each of the end surfaces of ceramic multilayer body 103, a conductor layer 104 is formed to cover the end surface. Conductor layer 104 is electrically connected to internal electrodes 102.

An insulating layer 105 is formed to cover conductor layer 104.

A pair of external electrodes 106 are formed on at least one of the main surfaces of ceramic multilayer body 103. External electrode 106 is electrically connected to conductor layer 104.

Multilayer ceramic capacitor 1000 is disadvantageous in that the joint strength between ceramic multilayer body 103 and conductor layer 104 is insufficient and conductor layer 104 may peel off from ceramic multilayer body 103.

A method of including a common ceramic material in conductor layer 104 is a method of solving this problem. For example, by including a ceramic material used for making ceramic multilayer body 103 in a conductive paste for forming conductor layer 104, the joint strength between ceramic multilayer body 103 and conductor layer 104 can be improved and peel-off of conductor layer 104 from ceramic multilayer body 103 can be suppressed. A large amount of common ceramic material in conductor layer 104, however, may lead to another problem of interference of the common ceramic material with electrical connection between internal electrodes 102 and conductor layer 104 and lowering the reliability of connection between internal electrodes 102 and conductor layer 103.

Furthermore, multilayer ceramic capacitor 1000 is disadvantageous in that it has insufficient reliability of electrical connection between conductor layer 104 and external electrode 106. Specifically, conductor layer 104 and external electrode 106 are connected to each other simply by linear connection between the end surface of conductor layer 104 and external electrode 106, and the reliability of electrical connection is disadvantageously insufficient.

SUMMARY OF THE INVENTION

Preferred embodiments of the present invention provide multilayer ceramic capacitors each having highly reliable electrical connection between a conductor layer and an external electrode.

A preferred embodiment of the present invention provides a ceramic multilayer body including a plurality of ceramic layers and a plurality of internal electrodes that are layered, the ceramic multilayer body including a pair of main surfaces opposed to each other in a height direction, a pair of side surfaces opposed to each other in a width direction orthogonal or substantially orthogonal to the height direction, and a pair of end surfaces opposed to each other in a length direction orthogonal or substantially orthogonal to both of the height direction and the width direction, a conductor layer covering each of the end surfaces of the ceramic multilayer body and electrically connected to the internal electrodes, an insulating layer covering the conductor layer, and an external electrode electrically connected to the conductor layer. The conductor layer extends to a portion of each of the main surfaces of the ceramic multilayer body.

In the multilayer ceramic capacitors according to preferred embodiments of the present invention, the conductor layer extends to a portion of each of the main surfaces of the ceramic multilayer body and thus joint strength between the ceramic multilayer body and the conductor layer is improved.

In the multilayer ceramic capacitors according to preferred embodiments of the present invention, a portion of the conductor layer that extends to the main surface of the ceramic multilayer body is able to two-dimensionally be electrically connected to the external electrode. Therefore, reliability of electrical connection between the conductor layer and the external electrode is improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a cross-sectional view of multilayer ceramic capacitor 100.

DETAILED DESCRIPTION OF THE PREFERRED EMBODIMENTS

Figure 1A:
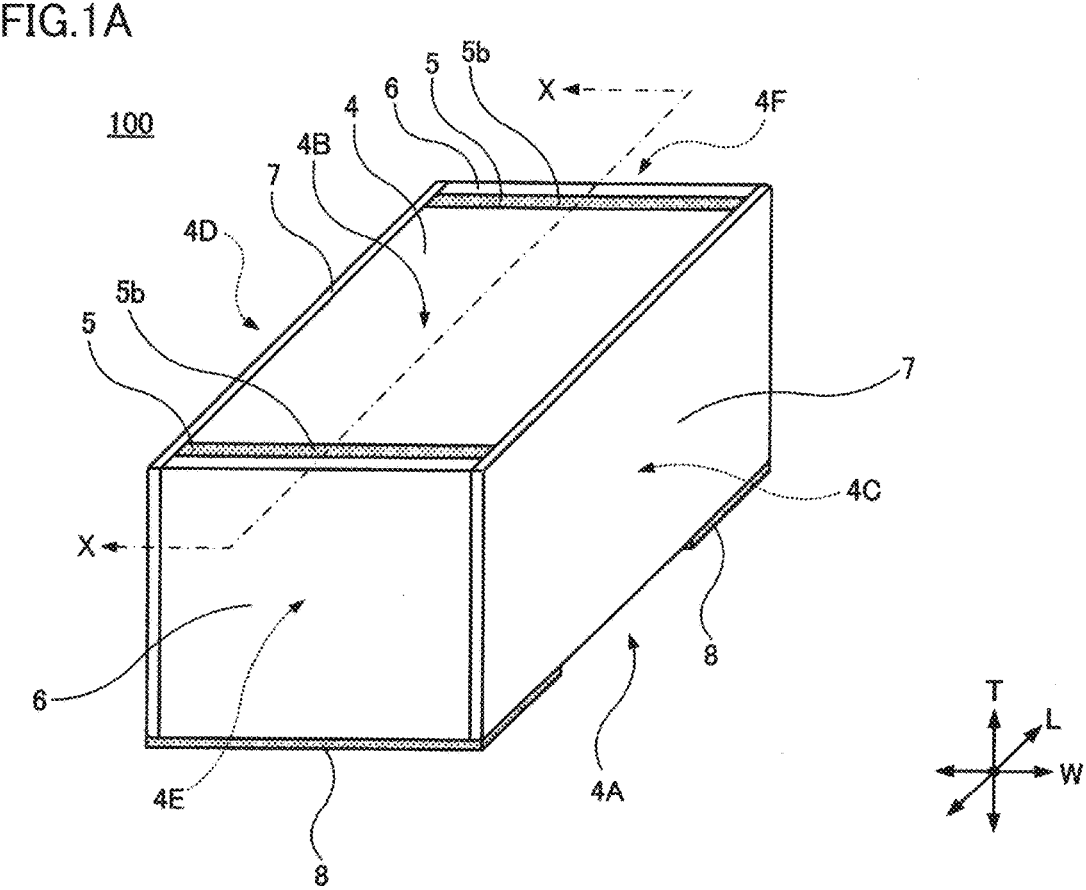
FIGS. 1A and 1B are each a perspective view of a multilayer ceramic capacitor 100 according to a first preferred embodiment of the present invention.

Preferred embodiments of the present invention will be described below with reference to the drawings.

Each preferred embodiment exemplarily shows a preferred embodiment of the present invention and the present invention is not limited to contents in the preferred embodiment. Contents described in different preferred embodiments can also be combined, and in that case, contents that are combined are also encompassed in the present invention. The drawings help understanding of the specification and may be schematically shown. A ratio of a dimension of a shown component or components may not be equal to a ratio of the dimension described in the specification. Components described in the specification may be omitted in the drawings or may be shown with the number thereof being reduced.

First Preferred Embodiment

Figure 1B:
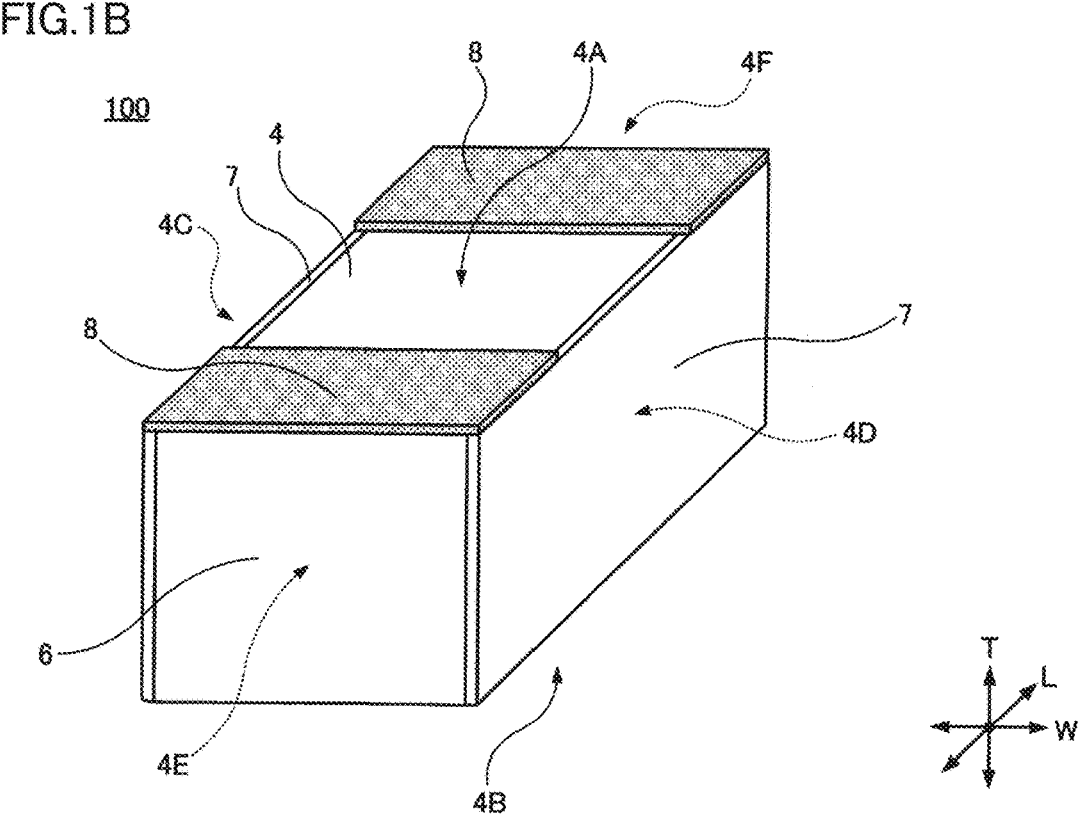
Figure 3:
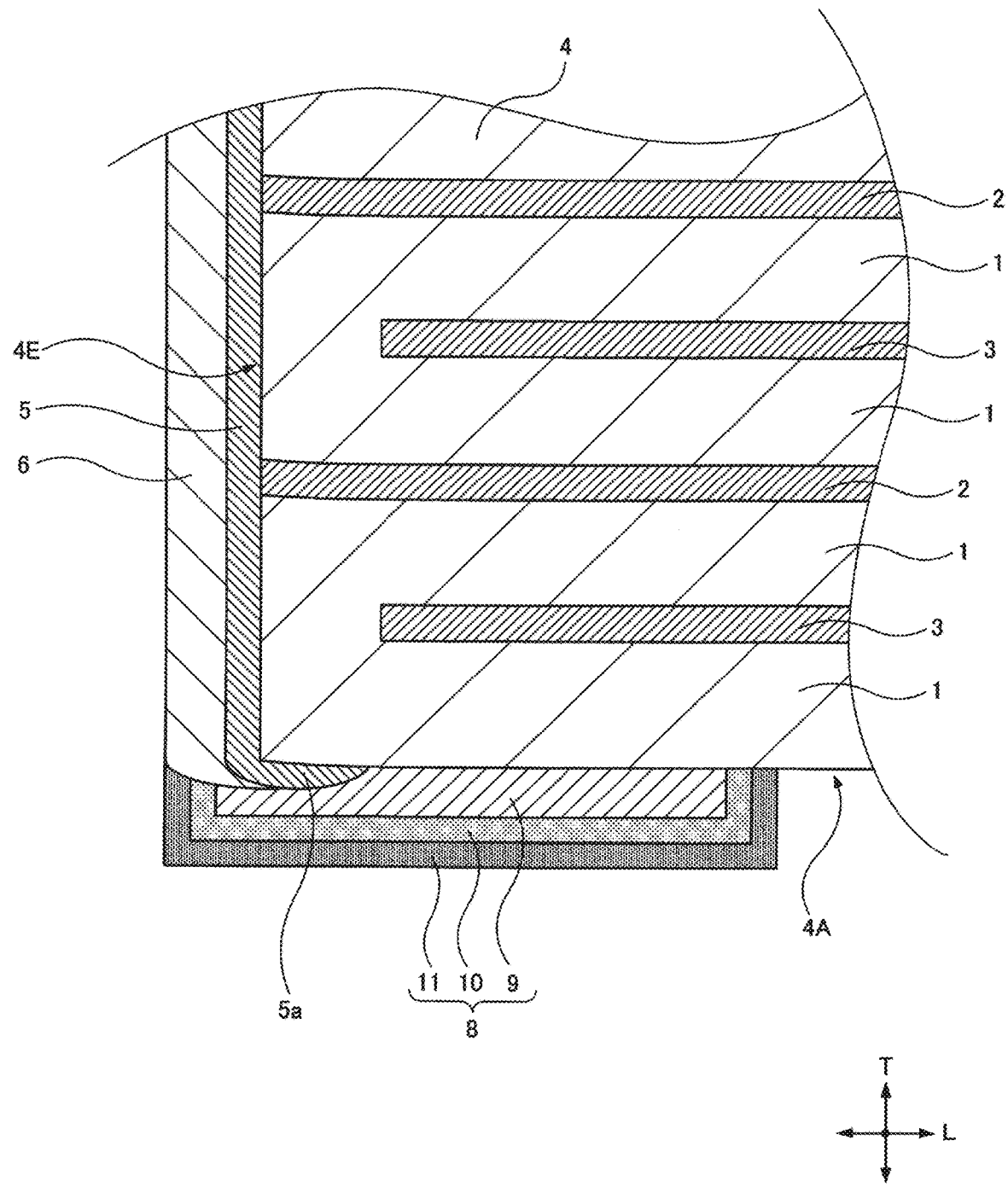
FIG. 3 is a cross-sectional view of a main part of multilayer ceramic capacitor 100.
Figure 4:
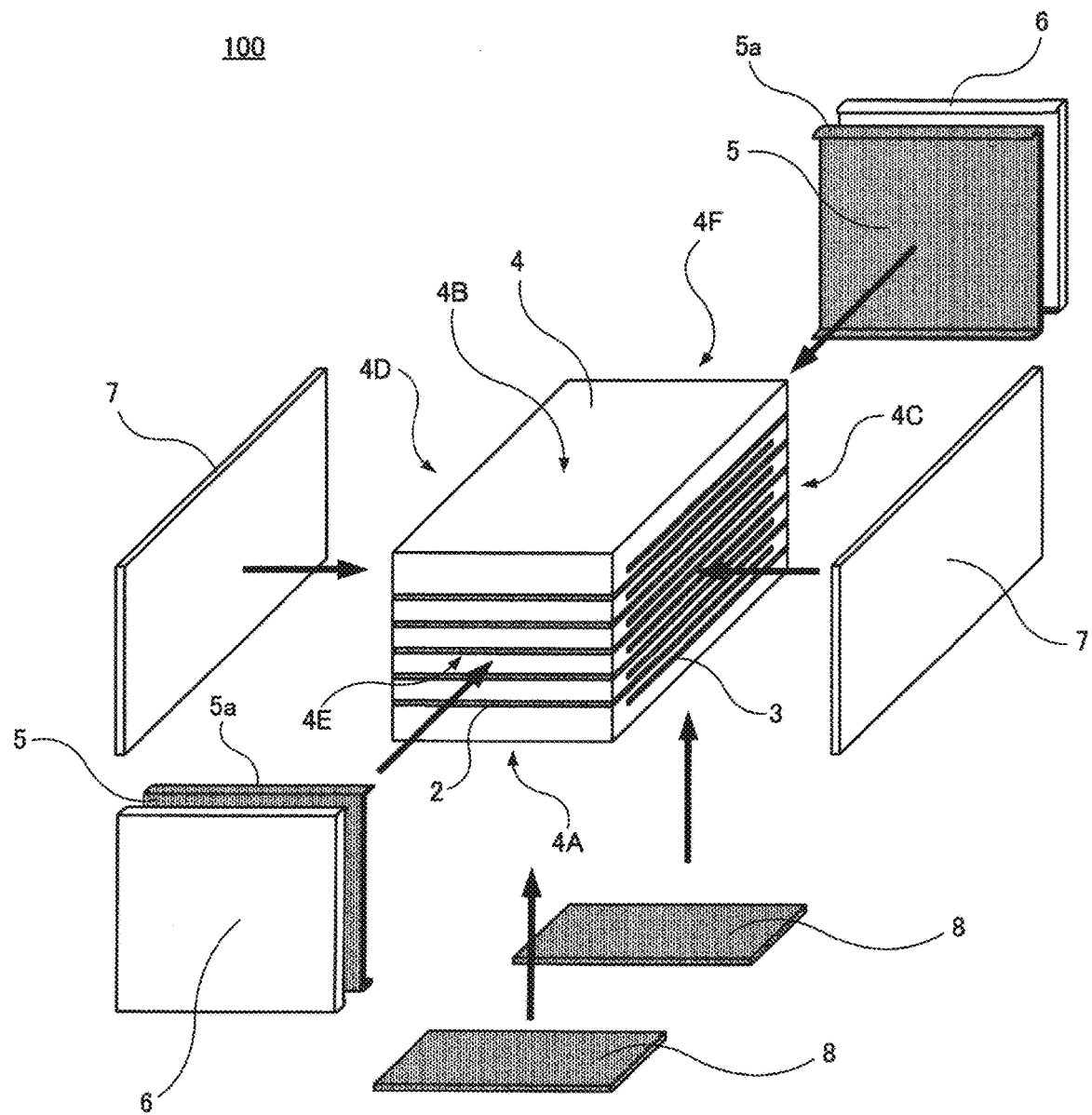
FIG. 4 is an exploded perspective view of multilayer ceramic capacitor 100.

FIGS. 1A, 1B, 2, 3, and 4 show a multilayer ceramic capacitor 100 according to a first preferred embodiment. FIG. 1A is a perspective view of multilayer ceramic capacitor 100 when viewed from above (a top surface side). FIG. 1B is a perspective view of multilayer ceramic capacitor 100 when viewed from below (a mount surface side). FIG. 2 is a cross-sectional view of multilayer ceramic capacitor 100 along X-X shown with a chain dotted arrow in FIG. 1A. FIG. 3 is a cross-sectional view of a main part of multilayer ceramic capacitor 100. FIG. 4 is an exploded perspective view of multilayer ceramic capacitor 100.

The drawings may show a height direction T, a width direction W, and a length direction L of multilayer ceramic capacitor 100 and these directions may be mentioned in the description below.

Multilayer ceramic capacitor 100 includes a ceramic multilayer body 4 including a plurality of ceramic layers 1, a plurality of first internal electrodes 2, and a plurality of second internal electrodes 3 that are layered. Ceramic multilayer body 4 has a parallelepiped or substantially parallelepiped shape, and includes a first main surface 4A and a second main surface 4B opposed to each other in height direction T, a first side surface 4C and a second side surface 4D opposed to each other in width direction W orthogonal or substantially orthogonal to height direction T, and a first end surface 4E and a second end surface 4F opposed to each other in length direction L orthogonal or substantially orthogonal to both of height direction T and width direction W.

Any material can be used for ceramic multilayer body 4 (ceramic layer 1), and for example, dielectric ceramics mainly composed of $BaTiO_3$ may preferably be used. Instead of $BaTiO_3$, dielectric ceramics mainly composed of another material such as, for example, $CaTiO_3$, $SrTiO_3$, or $CaZrO_3$ may be used. Although ceramic layer 1 may have any thickness, the thickness is preferably, for example, not smaller than about 0.3 μm and not larger than about 2.0 μm.

First internal electrode 2 extends to first end surface 4E of ceramic multilayer body 4. Second internal electrode 3 extends to second end surface 4F of ceramic multilayer body 4. In the present preferred embodiment, first internal electrode 2 and second internal electrode 3 include side portions exposed at first side surface 4C and second side surface 4D of ceramic multilayer body 4. This is because a side-surface insulating layer 7 which will be described later is provided on each of first side surface 4C and second side surface 4D of ceramic multilayer body 4 in the present preferred embodiment and thus insulation does not have to be taken into account. First internal electrode 2 and second internal electrode 3 may include the side portions not exposed at first side surface 4C and second side surface 4D of ceramic multilayer body 4.

In the present preferred embodiment, Ni, for example, is preferably used as a main component for first internal electrode 2 and second internal electrode 3. Any main component may be used for first internal electrode 2 and second internal electrode 3, and another metal such as, for example, Pd, Ag, or Cu may be used instead of Ni. Ni, Pd, Ag, or Cu may also be in a form of an alloy with another metal. Although first internal electrode 2 and second internal electrode 3 may have any thickness, the thickness is preferably, for example, not larger than about 10 μm and further preferably not larger than about 1 μm.

Conductor layer 5 is provided on each of first end surface 4E and second end surface 4F of ceramic multilayer body 4. Conductor layer 5 is electrically connected to first internal electrode 2 or second internal electrode 3.

Conductor layer 5 includes a portion 5a that extends to first main surface 4A of ceramic multilayer body 4 and a portion 5b that extends to second main surface 4B thereof. With extending portions 5a and 5b, joint strength of conductor layer 5 to ceramic multilayer body 4 is significantly improved. Extending portions 5a and 5b have a length in length direction L preferably not smaller than about 2 μm, for example. With extending portions 5a and 5b having a length not smaller than about 2 μm, joint strength of conductor layer 5 to ceramic multilayer body 4 is further improved.

Conductor layer 5 includes portion 5a that extends to first main surface 4A of ceramic multilayer body 4 and portion 5b that extends to second main surface 4B thereof so that reliability of electrical connection between conductor layer 5 and an external electrode 8 which will be described is significantly improved.

In the present preferred embodiment, Ni, for example, is preferably used as a main component of conductor layer 5.

Since Ni is also used as the main component of first internal electrode 2 and second internal electrode 3 as described above in the present preferred embodiment, electrical connection of conductor layer 5 to first internal electrode 2 and second internal electrode 3 is satisfactory. Any main component may be used for conductor layer 5, and another metal such as, for example, Pd, Ag, or Cu may be used instead of Ni. Ni, Pd, Ag, or Cu may be in a form of an alloy with another metal. When a component other than Ni is used as the main component of first internal electrode 2 and second internal electrode 3, the main component of conductor layer 5 is preferably the same as the main component of first internal electrode 2 and second internal electrode 3.

Although conductor layer 5 may have any thickness, the thickness is preferably, for example, not smaller than about 3 μm and not larger than about 10 μm in a central portion of first end surface 4E and second end surface 4F of ceramic multilayer body 4. When the thickness is not smaller than about 3 μm, reliability of electrical connection of conductor layer 5 to first internal electrode 2 and second internal electrode 3 can be obtained. When the thickness is not larger than about 10 μm, multilayer ceramic capacitor 100 can have reduced dimensions. When the dimension of multilayer ceramic capacitor 100 is the same, first internal electrode 2 and second internal electrode 3 can have larger dimensions in a planar direction and a capacitance can be increased.

Conductor layer 5 preferably includes ceramics. In this case, joint strength between conductor layer 5 and ceramic multilayer body 4 is improved. Ceramics included in conductor layer 5 is preferably the same as the main component of ceramic multilayer body 4 (ceramic layer 1) because joint strength between conductor layer 5 and ceramic multilayer body 4 is further improved.

When conductor layer 5 includes ceramics, a content thereof is preferably not higher than about 20 wt %, for example. When the content of ceramics is not higher than about 20 wt %, electrical connection between conductor layer 5 and first internal electrode 2 or second internal electrode 3 can be maintained. When the content of ceramics is not higher than about 20 wt %, portion 5a of conductor layer 5 that extends to first main surface 4A of ceramic multilayer body 4 and portion 5b thereof that extends to second main surface 4B can be provided. Preferably, the content of ceramics in conductor layer 5 is not higher than about 20 wt % and additionally first internal electrode 2 and second internal electrode 3 preferably have a thickness not larger than about 1 μm, for example. When the content of ceramics in conductor layer 5 is not higher than about 20 wt %, electrical connection between first internal electrode 2 or second internal electrode 3 and conductor layer 5 can be maintained even though first internal electrode 2 and second internal electrode 3 have a thickness not larger than about 1 μm.

An insulating layer 6 covers conductor layer 5. In the present preferred embodiment, a material the same as the material for ceramic multilayer body 4 (ceramic layer 1) is preferably used as a material for insulating layer 6. Any material for insulating layer 6 may be used and a material different from the material for ceramic multilayer body 4 may be used.

Although insulating layer 6 may have any thickness, the thickness is preferably, for example, not smaller than about 5 μm and not larger than about 30 μm. When the thickness is not smaller than about 5 μm, a function to insulate and protect conductor layer 5 can be sufficiently provided. When the thickness is not larger than about 30 μm, multilayer ceramic capacitor 100 can have smaller dimensions. When the dimension of multilayer ceramic capacitor 100 is the same, first internal electrode 2 and second internal electrode 3 can have larger dimensions in the planar direction and a capacitance can be increased.

Side-surface insulating layer 7 is provided on each of first side surface 4C and second side surface 4D of ceramic multilayer body 4. Side-surface insulating layer 7 insulates the side portions of first internal electrode 2 and second internal electrode 3 exposed at first side surface 4C and second side surface 4D of ceramic multilayer body 4. Since multilayer ceramic capacitor 100 includes side-surface insulating layer 7, first internal electrode 2 and second internal electrode 3 can have larger dimensions in width direction W and a capacitance can be increased.

In the present preferred embodiment, a material the same as the material for ceramic multilayer body 4 (ceramic layer 1) is preferably used as a material for side-surface insulating layer 7. Therefore, side-surface insulating layer 7 is joined to ceramic multilayer body 4 with high joint strength. Any material for side-surface insulating layer 7 may be used, and a material different from the material for ceramic multilayer body 4 may be used.

In the present preferred embodiment, conductor layer 5 and insulating layer 6 are provided on first end surface 4E and second end surface 4F of ceramic multilayer body 4 and thereafter side-surface insulating layer 7 is provided on first side surface 4C and second side surface 4D of ceramic multilayer body 4. The order, however, may be changed; side-surface insulating layer 7 may be provided on first side surface 4C and second side surface 4D of ceramic multilayer body 4 and thereafter conductor layer 5 and insulating layer 6 may be provided on first end surface 4E and second end surface 4F of ceramic multilayer body 4.

A pair of external electrodes 8 are provided on first main surface 4A of ceramic multilayer body 4. In the present preferred embodiment, external electrode 8 has a rectangular or substantially rectangular shape when viewed in height direction T. The pair of external electrodes 8 are provided at opposing ends of first main surface 4A of ceramic multilayer body 4 at a distance from each other.

In the present preferred embodiment, external electrode 8 preferably has, for example, a three-layered structure including an underlying external electrode layer 9 mainly composed of Cu, a first plated layer 10 mainly composed of Ni, and a second plated layer 11 mainly composed of Sn. Underlying external electrode layer 9 includes glass.

Any suitable structure or material of external electrode 8 may be used, and limitation to the above is not intended. The number of layers in external electrode 8 is not limited to three, and a material for each layer can be suitably changed. For example, another metal such as Ag or Ni instead of Cu may be used for underlying external electrode layer 9. Cu, Ag, or Ni may be in a form of an alloy with another metal. Underlying external electrode layer 9 does not have to include glass.

External electrode 8 is electrically connected to conductor layer 5 provided on first end surface 4E or second end surface 4F of ceramic multilayer body 4. External electrode 8 is two-dimensionally connected to portion 5a of conductor layer 5 that extends to first main surface 4A, at first main surface 4A of ceramic multilayer body 4. Therefore, reliability of electrical connection between external electrode 8 and ceramic multilayer body 4 is improved.

Although the pair of external electrodes 8 are provided on first main surface 4A of ceramic multilayer body 4 in the present preferred embodiment, another pair of external electrodes may be additionally provided on second main surface 4B of ceramic multilayer body 4. The additional pair of external electrodes may be connected to portion 5b of conductor layer 5 that extends to second main surface 4B. In this case, not only first main surface 4A of ceramic multilayer body 4 but also second main surface 4B can serve as a mount surface of multilayer ceramic capacitor 100. When no external electrode is additionally formed on second main surface 4B of ceramic multilayer body 4, insulation treatment may be performed, for example, by covering portion 5b that extends to second main surface 4B of ceramic multilayer body 4 with an insulator.

As set forth above, in multilayer ceramic capacitor 100 according to the first preferred embodiment, conductor layer 5 includes portion 5a that extends to first main surface 4A of ceramic multilayer body 4 and portion 5b that extends to second main surface 4B thereof. Therefore, joint strength between ceramic multilayer body 4 and conductor layer 5 is improved. In a structure where conductor layer 104 is provided only on the end surface of ceramic multilayer body 103 as in conventional multilayer ceramic capacitor 1000 disclosed in Japanese Patent Laid-Open No. 2017-175037, when stress is applied to conductor layer 104 in a direction away from the end surface of ceramic multilayer body 103, conductor layer 104 may readily peel off from the end surface of ceramic multilayer body 103 even though the stress is weak. In contrast, in multilayer ceramic capacitor 100 according to the first preferred embodiment, even though stress is applied to conductor layer 5 in a direction away from first end surface 4E and second end surface 4F of ceramic multilayer body 4 (length direction L), portion 5a of conductor layer 5 that extends to first main surface 4A of ceramic multilayer body 4 and portion 5b that extends to second main surface 4B thereof prevent peel-off and thus conductor layer 5 does not readily peel off from first end surface 4E and second end surface 4F of ceramic multilayer body 4. Thus, in multilayer ceramic capacitor 100, peel-off of conductor layer 5 from ceramic multilayer body 4 is reduced or prevented by portion 5a of conductor layer 5 that extends to first main surface 4A and portion 5b thereof that extends to second main surface 4B.

In multilayer ceramic capacitor 100 according to the first preferred embodiment, portion 5a of conductor layer 5 that extends to first main surface 4A and external electrode 8 are two-dimensionally connected to each other and thus reliability of electrical connection between conductor layer 5 and external electrode 8 is improved.

In multilayer ceramic capacitor 100 according to the first preferred embodiment, at first end surface 4E of ceramic multilayer body 4 to which first internal electrode 2 extends and second end surface 4F of ceramic multilayer body 4 to which second internal electrode 3 extends, conductor layer 5 is covered with insulating layer 6 and thus moisture resistance is improved.

In multilayer ceramic capacitor 100 according to the first preferred embodiment, insulating layer 6 is provided on first end surface 4E and second end surface 4F of ceramic multilayer body 4 and side-surface insulating layer 7 is provided on first side surface 4C and second side surface 4D of ceramic multilayer body 4. Since the multilayer ceramic capacitor is joined to an electrode on a circuit substrate or the like only by external electrodes 8 provided on the first main surface of ceramic multilayer body 4, the multilayer ceramic capacitor can be mounted in proximity to another electronic component.

Exemplary Method of Manufacturing Multilayer Ceramic Capacitor 100

Multilayer ceramic capacitor 100 according to the first preferred embodiment can be manufactured, for example, with a method described below. Description will be provided with reference to FIGS. 5A to 8G. FIGS. 5A to 8G are each a cross-sectional view of a main portion showing a step performed in an exemplary method of manufacturing multilayer ceramic capacitor 100 according to the present preferred embodiment. In FIGS. 5A to 8G, multilayer ceramic capacitor 100 is shown with first main surface 4A thereof being located above and second main surface 4B thereof being located below, as in FIG. 1B.

Although not shown, a ceramic green sheet is made. The ceramic green sheet is used to make ceramic layer 1, insulating layer 6, or side-surface insulating layer 7 of ceramic multilayer body 4.

Specifically, initially, powders of dielectric ceramics, a binder resin, and a solvent are prepared and ceramic slurry is made by mixing them in a wet process.

Then, the ceramic green sheet is made by applying the ceramic slurry in a sheet shape on a carrier film by using a die coater, a gravure coater, or a microgravure coater, for example, and drying the same.

Then, in order to form first internal electrode 2 and second internal electrode 3, a conductive paste prepared in advance is printed in a desired pattern on a main surface of a prescribed ceramic green sheet of ceramic green sheets for making ceramic layer 1. No conductive paste is printed on a ceramic green sheet that defines and functions as a protective layer. In the present preferred embodiment, as described above, first internal electrode and second internal electrode 3 are mainly composed of Ni. Therefore, a conductive paste including Ni is used as the conductive paste.

Figure 5A:
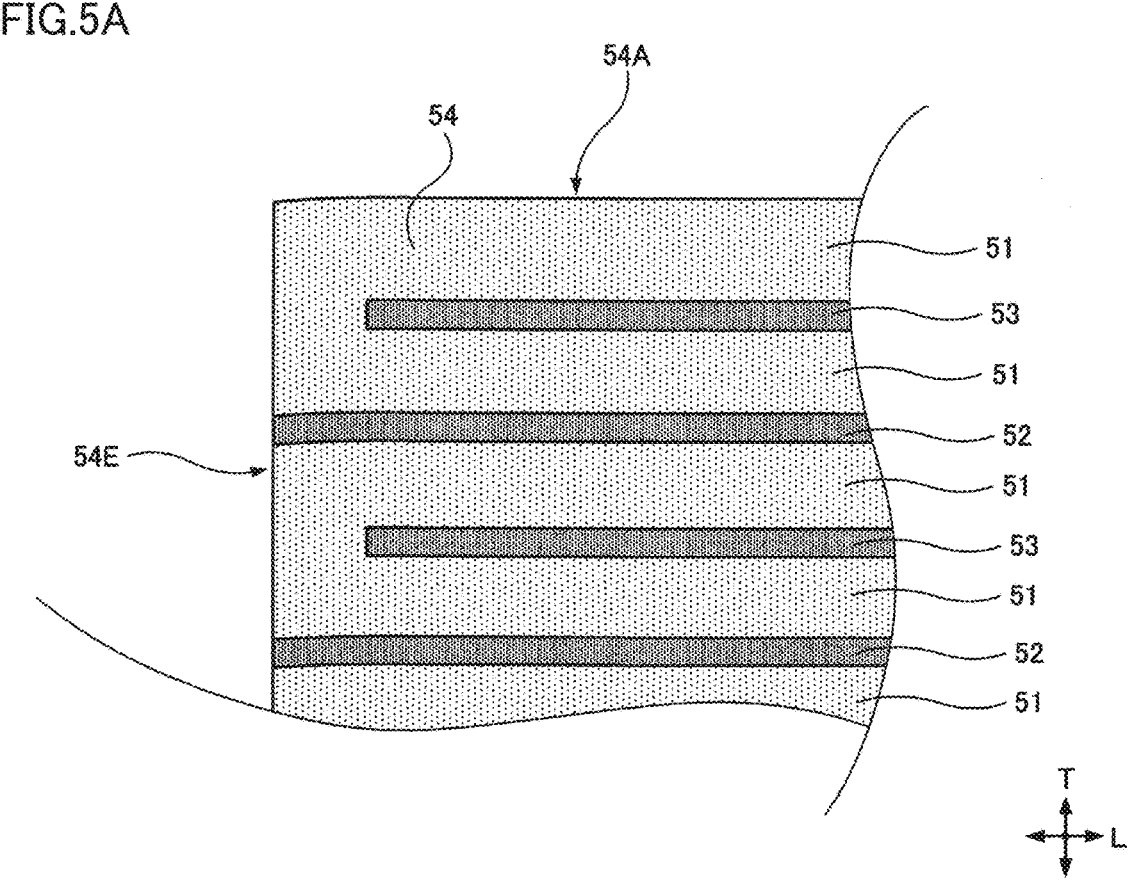
FIGS. 5A and 5B are each a cross-sectional view of a main portion showing a step performed in an exemplary method of manufacturing multilayer ceramic capacitor 100.

Then, as shown in FIG. 5A, an unfired ceramic multilayer body 54 is made. Unfired ceramic multilayer body 54 is made by layering a ceramic green sheet 51 for forming ceramic layer 1, a conductive paste 52 for forming first internal electrode 2, and a conductive paste 53 for forming second internal electrode 3 and compression-bonding and integrating the ceramic green sheets and the conductive pastes by heating. Unfired ceramic multilayer body has a parallelepiped or substantially parallelepiped shape including a first main surface 54A, a second main surface 54B, a first side surface 54C, a second side surface 54D, a first end surface 54E, and a second end surface 54F. In FIGS. 5A to 6C, only first main surface 54A and first end surface 54E of these surfaces are seen.

Then, although not shown, a conductive paste for forming conductor layer 5 is applied to one main surface of a ceramic green sheet for forming insulating layer 6. In the present preferred embodiment, conductor layer 5 is mainly composed of Ni as described above. Therefore, a conductive paste including Ni is used as the conductive paste. Any method of applying a conductive paste is applicable, and exemplary methods include screen printing and application by a roller.

Figure 5B:
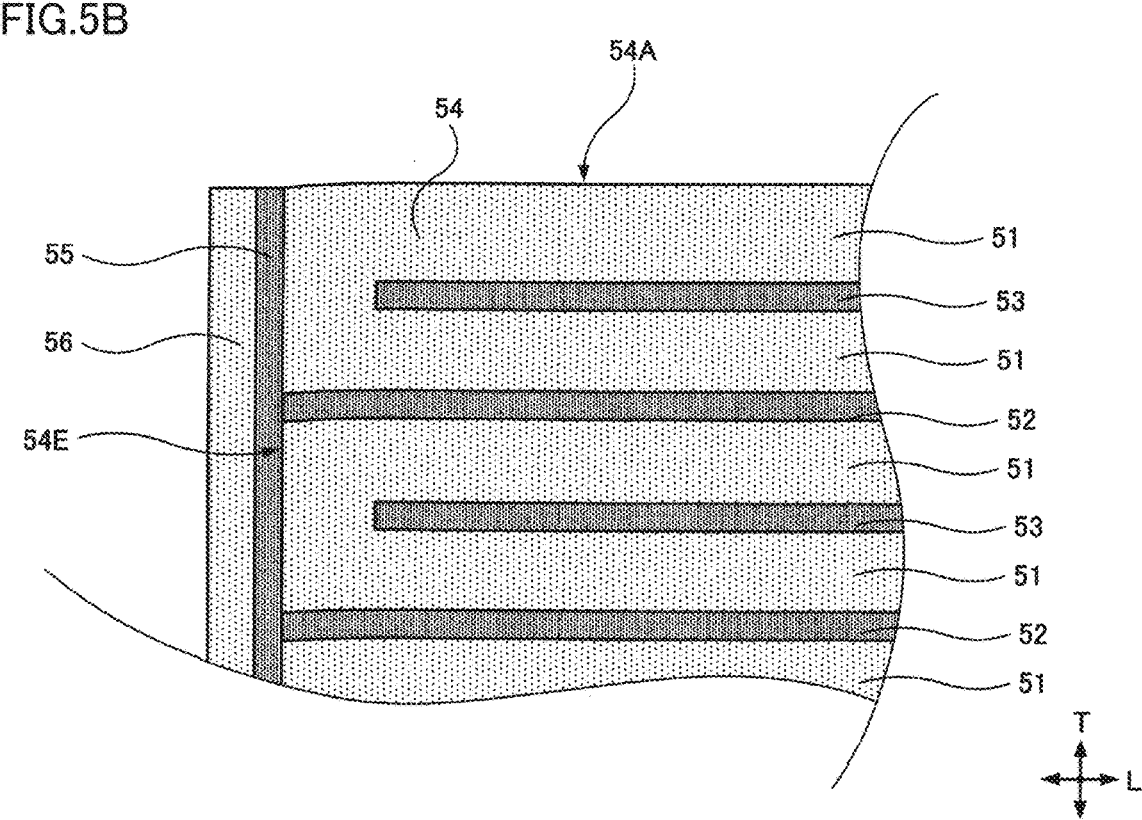

Then, as shown in FIG. 5B, a ceramic green sheet 56 to which a conductive paste 55 has been applied is bonded to first end surface 54E of unfired ceramic multilayer body 54. Specifically, ceramic green sheet 56 to which conductive paste 55 has been applied is bonded to first end surface 54E of unfired ceramic multilayer body 54 by causing first end surface 54E of unfired ceramic multilayer body 54 to abut conductive paste 55 applied to ceramic green sheet 56 and then punching ceramic green sheet 56. Although not shown, ceramic green sheet 56 to which conductive paste 55 has been applied is also bonded to second end surface 54F of unfired ceramic multilayer body 54 with a similar method.

Then, although not shown, a ceramic green sheet 57 for forming side-surface insulating layer 7 is bonded to first side surface 54C and second side surface 54D of unfired ceramic multilayer body 54. Specifically, ceramic green sheet 57 for forming side-surface insulating layer 7 is bonded to first side surface 54C and second side surface 54D of unfired ceramic multilayer body 54 by causing first side surface 54C or second side surface 54D of unfired ceramic multilayer body 54 to abut on one main surface of ceramic green sheet 57 for forming side-surface insulating layer 7 and then punching ceramic green sheet 57.

Figure 6C:
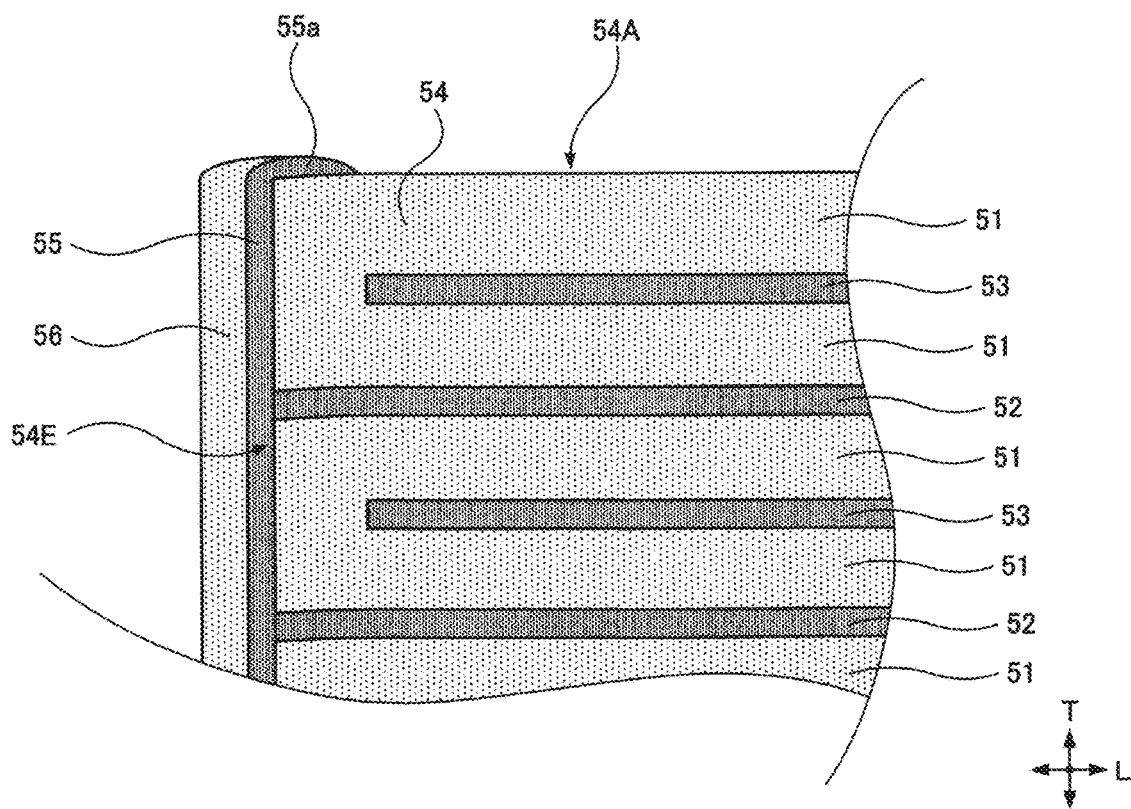
FIG. 6C is continuation of FIG. 5B and a cross-sectional view of a main portion showing a step performed in the exemplary method of manufacturing multilayer ceramic capacitor 100.

Then, unfired ceramic multilayer body 54 is subjected to a barrel treatment to extend conductive paste 55 for forming conductor layer 5 to form an extending portion 55a of conductive paste 55 over first main surface 54A of unfired ceramic multilayer body 54 as shown in FIG. 6C. Although not shown, an extending portion 55b of conductive paste 55 is also formed over second main surface 54B of unfired ceramic multilayer body 54.

Figure 6D:
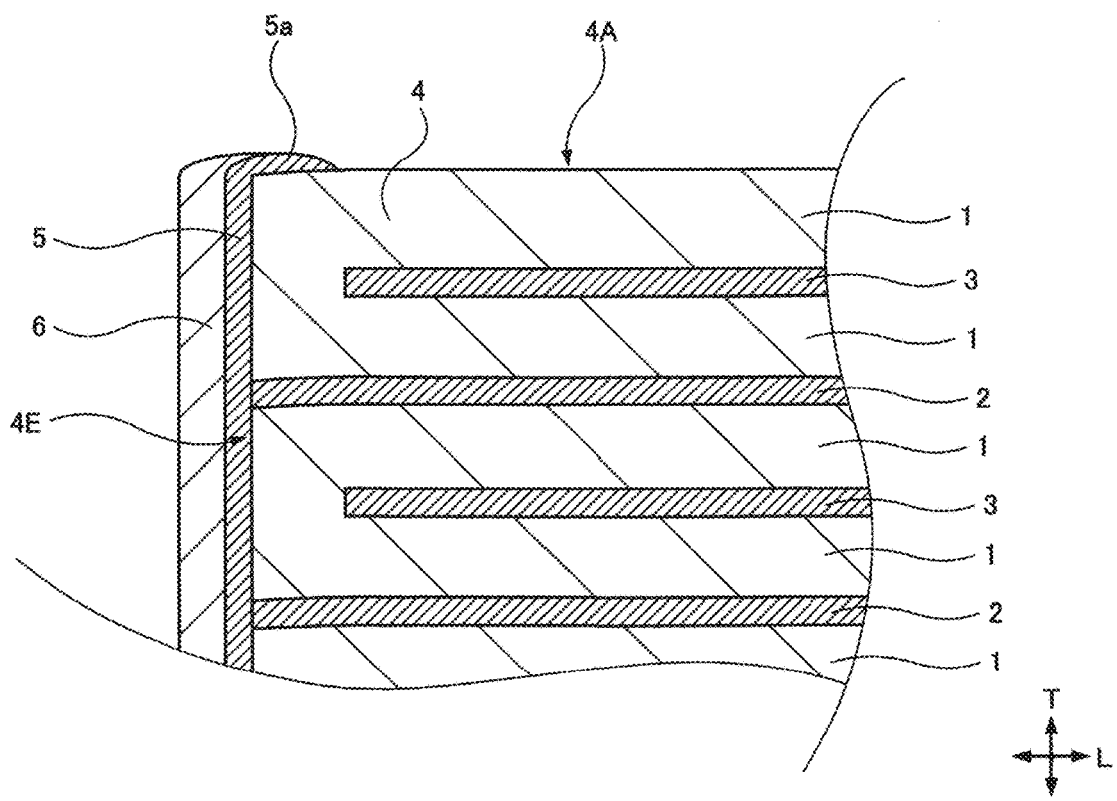
FIG. 6D is a cross-sectional view of a main portion showing a step performed in the exemplary method of manufacturing multilayer ceramic capacitor 100.

Then, ceramic multilayer body 4 shown in FIG. 6D is made by firing unfired ceramic multilayer body 54 in a prescribed profile. Before firing, preferably, binder removal treatment is performed to eliminate or reduce the binder resin included in unfired ceramic multilayer body 54. By making ceramic multilayer body 4 by firing unfired ceramic multilayer body 54, ceramic green sheet 51 is fired to be ceramic layer 1, conductive paste 52 is fired to be first internal electrode 2, conductive paste 53 is fired to be second internal electrode 3, conductive paste 55 is fired to be conductor layer 5, ceramic green sheet 56 is fired to be insulating layer 6, and ceramic green sheet 57 is fired to be side-surface insulating layer 7. Portion 55a of conductive paste 55 that extends over first main surface 54A becomes portion 5a and portion 55b of conductive paste 55 that extends over second main surface 54B becomes portion 5b.

Figure 7E:
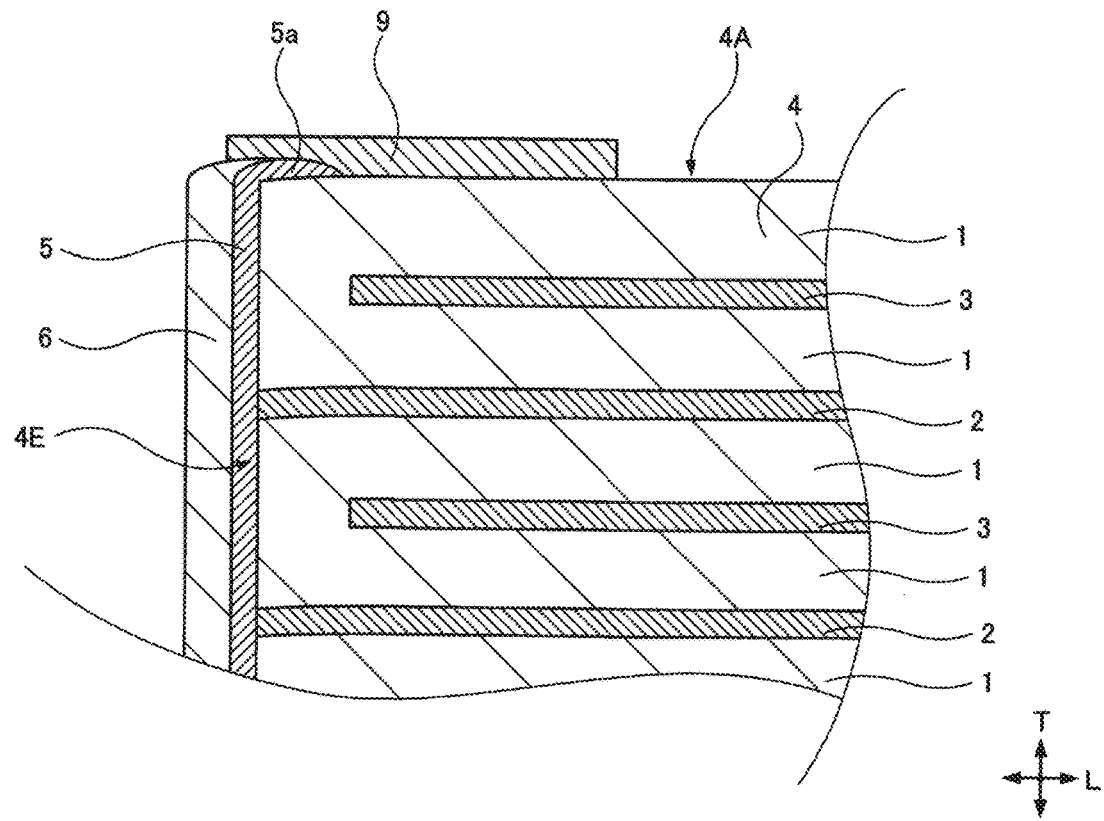
FIG. 7E is continuation of FIG. 6D and a cross-sectional view of a main portion showing a step performed in the exemplary method of manufacturing multilayer ceramic capacitor 100.

Then, as shown in FIG. 7E, underlying external electrode layer 9 which is a portion of external electrode 8 is formed on first main surface 4A of ceramic multilayer body 4. Specifically, underlying external electrode layer 9 is formed on first main surface 4A of ceramic multilayer body 4 by applying and baking a conductive paste. Any method of applying a conductive paste is applicable, and exemplary methods include screen printing and application by a roller.

Underlying external electrode layer 9 is two-dimensionally electrically connected to portion 5a of conductor layer 5 that extends to first main surface 4A of ceramic multilayer body 4. Therefore, reliability of electrical connection between conductor layer 5 and underlying external electrode layer 9 is improved.

Since underlying external electrode layer 9 is mainly composed of Cu as described above in the present preferred embodiment, a conductive paste including Cu is used as the conductive paste. In order to improve joint strength between underlying external electrode layer 9 and ceramic multilayer body 4, the conductive paste may preferably include glass.

Figure 7F:
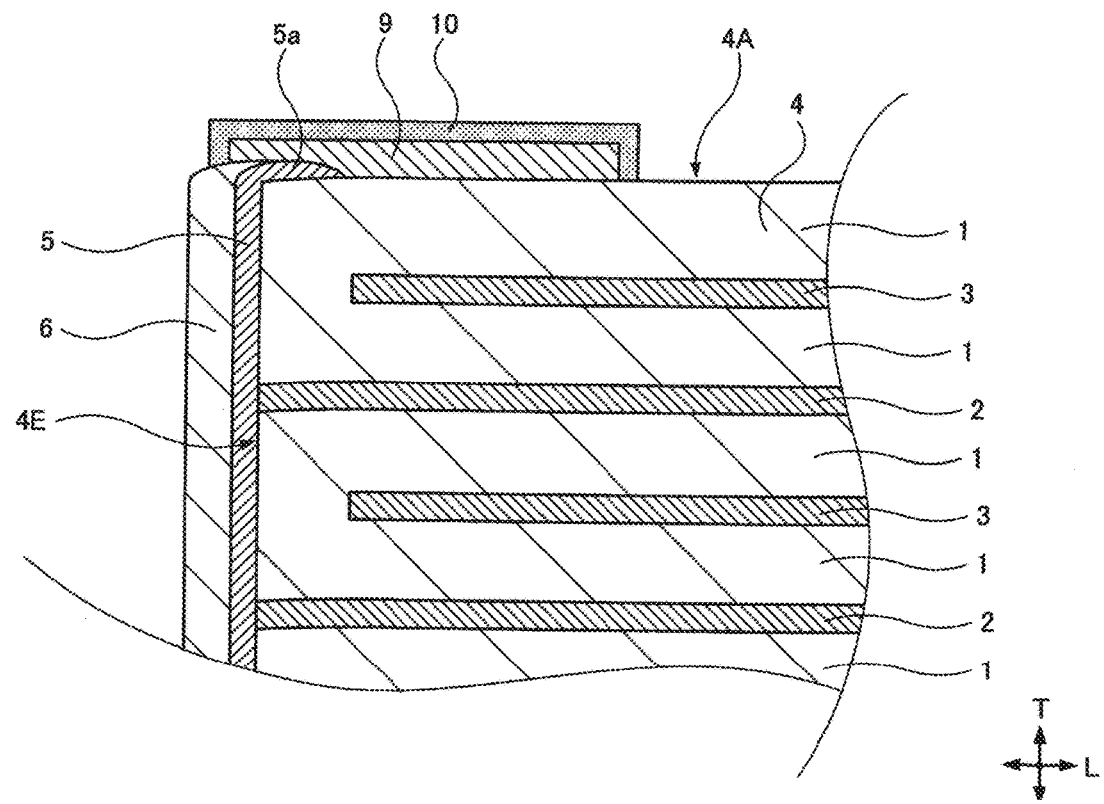
FIG. 7F is a cross-sectional view of a main portion showing a step performed in the exemplary method of manufacturing multilayer ceramic capacitor 100.

Then, as shown in FIG. 7F, first plated layer 10 mainly composed of Ni is formed on a surface of underlying external electrode layer 9 by electrolytic plating, for example.

Figure 8G:
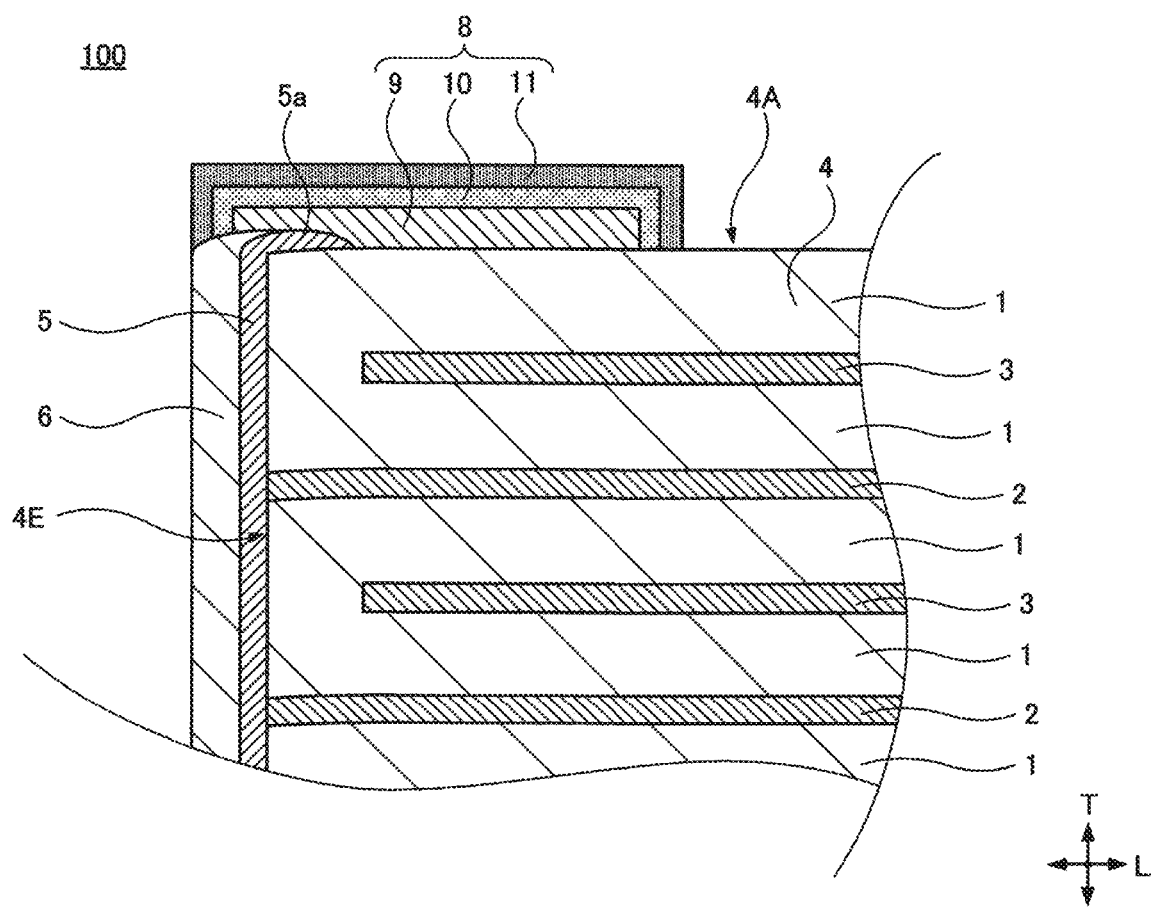
FIG. 8G is continuation of FIG. 7F and a cross-sectional view of a main portion showing a step performed in the exemplary method of manufacturing multilayer ceramic capacitor 100.

Then, as shown in FIG. 8G, second plated layer 11 mainly composed of Sn is formed on a surface of first plated layer 10 by electrolytic plating, for example. As set forth above, external electrode 8 including three layers including underlying external electrode layer 9, first plated layer 10, and second plated layer 11 is formed and multilayer ceramic capacitor 100 according to the first preferred embodiment is completed.

Multilayer ceramic capacitor 100 according to the first preferred embodiment can also partially be modified as described below.

First Modification of Multilayer Ceramic Capacitor 100 According to First Preferred Embodiment In multilayer ceramic capacitor 100, underlying external electrode layer 9 of external electrode 8 is formed by applying a conductive paste to first main surface 4A of ceramic multilayer body 4 and baking the conductive paste, which is modified in a first modification. An underlying electrode layer of the external electrode is formed by sputtering Cu on first main surface 4A of ceramic multilayer body 4.

An external electrode having a three-layered structure is also made in the first modification by forming first plated layer 10 mainly composed of Ni on the underlying electrode layer formed by sputtering Cu and forming second plated layer 11 mainly composed of Sn on first plated layer 10.

Second Modification of Multilayer Ceramic Capacitor 100 According to First Preferred Embodiment The first modification is further modified into a second modification. Specifically, in the first modification, the external electrode has the three-layered structure including the underlying electrode layer formed by sputtering Cu, first plated layer 10 mainly composed of Ni, and second plated layer 11 mainly composed of Sn. The second modification is a further modification in which first plated layer 10 is replaced with a second layer formed by sputtering Ni and second plated layer 11 is replaced with a third layer formed by sputtering Sn.

In the second modification, the external electrode has a three-layered structure including a first layer (underlying electrode layer) formed by sputtering Cu, the second layer formed by sputtering Ni, and the third layer formed by sputtering Sn.

Second Preferred Embodiment

Figure 9:
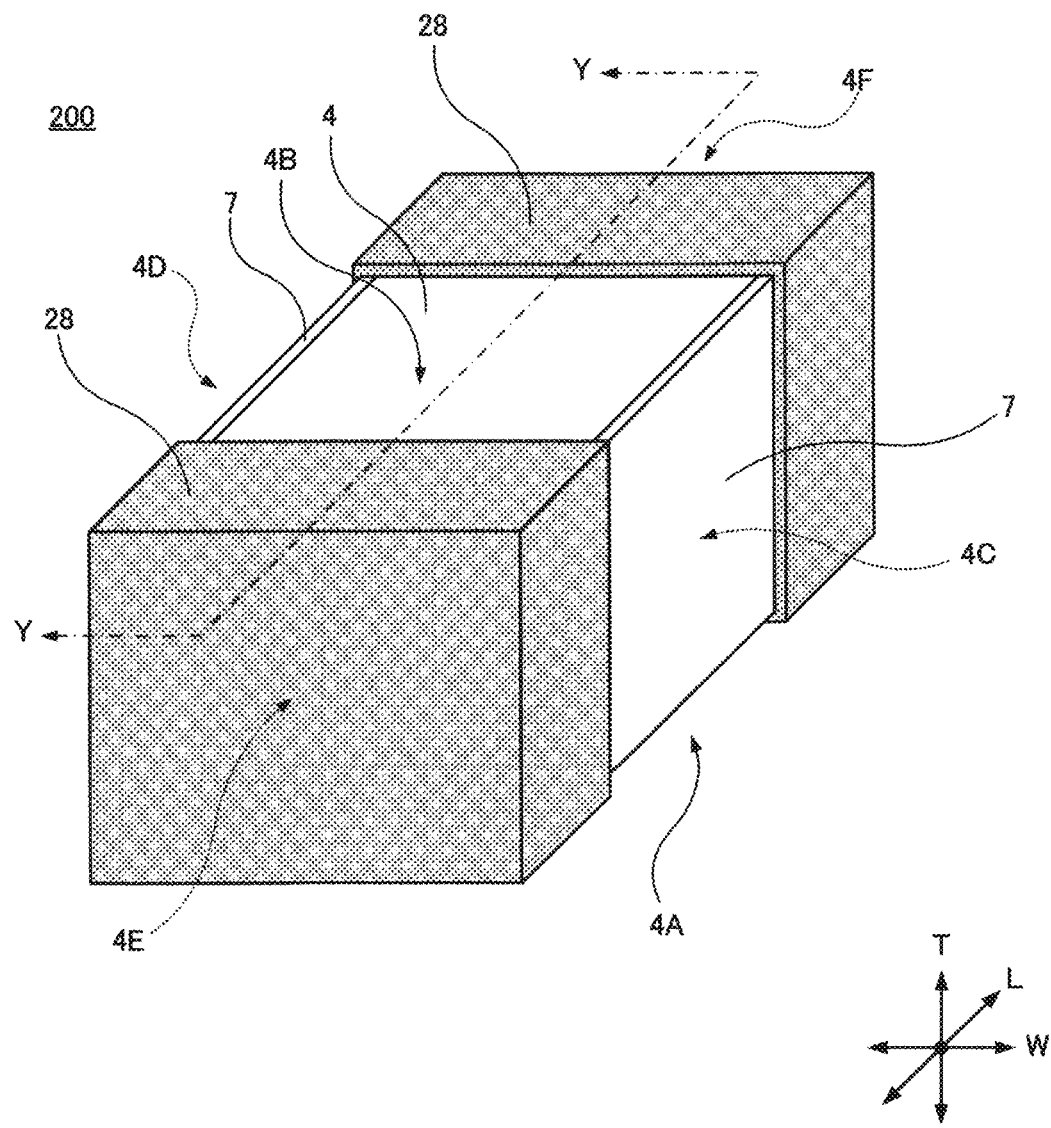
FIG. 9 is a perspective view of a multilayer ceramic capacitor 200 according to a second preferred embodiment of the present invention.
Figure 10:
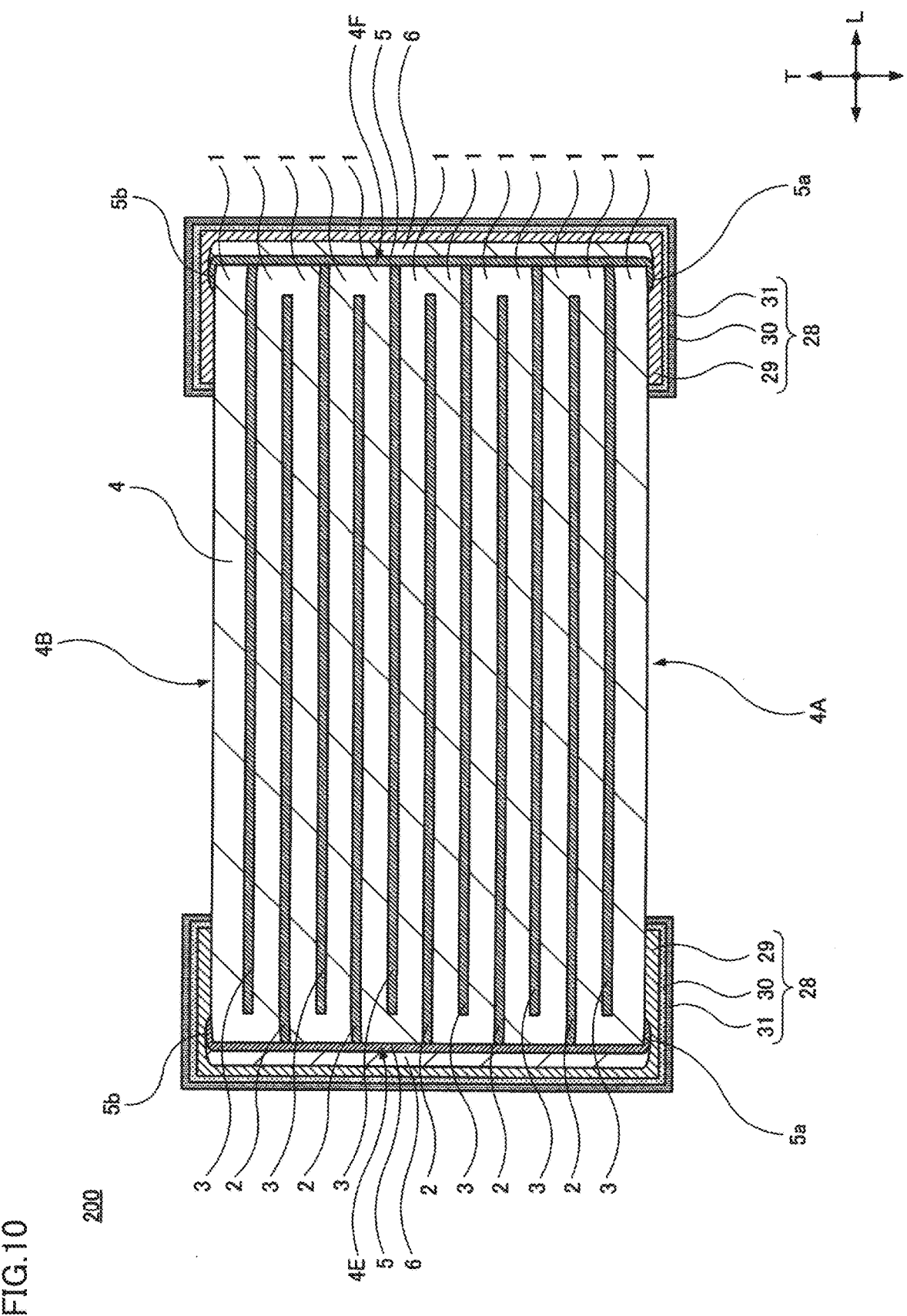
FIG. 10 is a cross-sectional view of multilayer ceramic capacitor 200.
Figure 11:
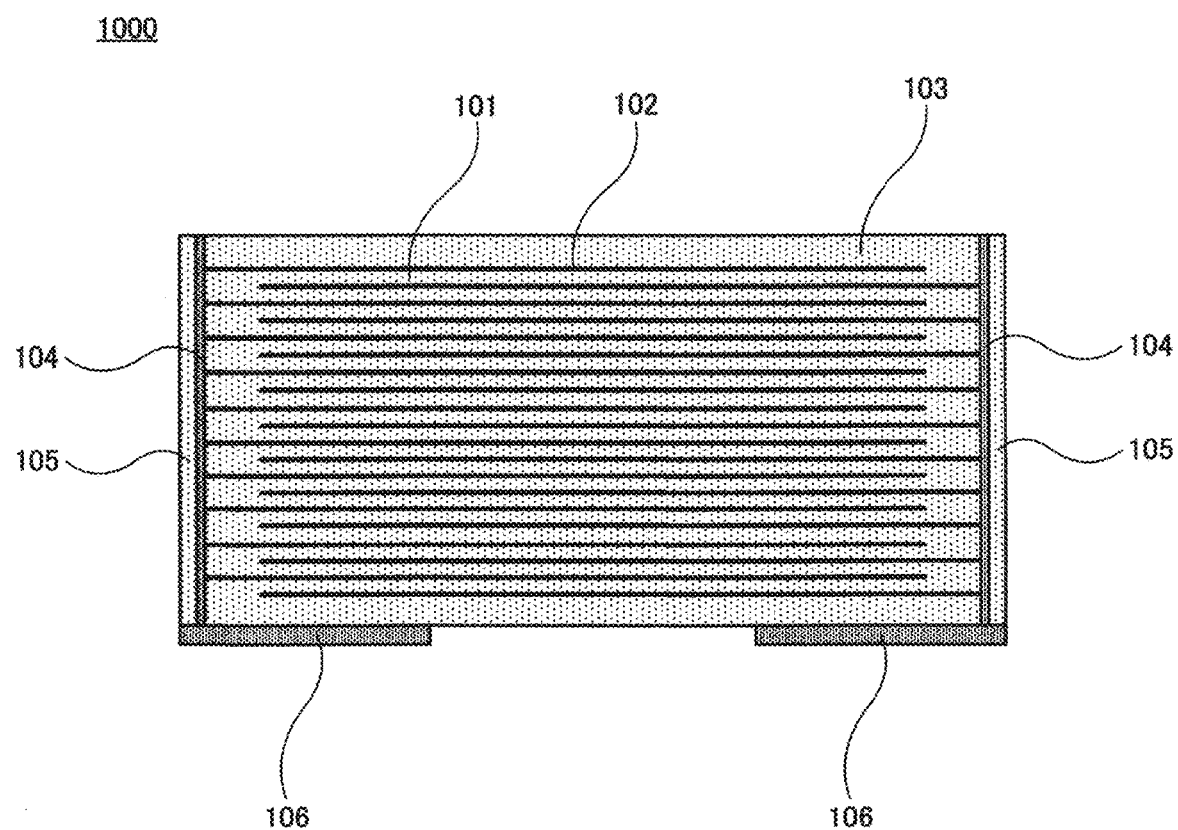
FIG. 11 is a cross-sectional view of a multilayer ceramic capacitor 1000 disclosed in Japanese Patent Laid-Open No. 2017-175037.

FIGS. 9 and 10 show a multilayer ceramic capacitor 200 according to a second preferred embodiment of the present invention. FIG. 9 is a perspective view of multilayer ceramic capacitor 200 when viewed from above (the top surface side). FIG. 10 is a cross-sectional view of multilayer ceramic capacitor 200 along Y-Y shown with a chain dotted arrow in FIG. 9.

Multilayer ceramic capacitor 200 according to the second preferred embodiment is obtained by partially modifying the construction of multilayer ceramic capacitor 100 according to the first preferred embodiment. Specifically, in multilayer ceramic capacitor 100, external electrode 8 has a rectangular or substantially rectangular shape when viewed in height direction T and provided on first main surface 4A of ceramic multilayer body 4, which is modified in multilayer ceramic capacitor 200. An external electrode 28 has a cap shape on each of first end surface 4E and second end surface 4F of ceramic multilayer body 4.

More specifically, one external electrode 28 is provided on insulating layer 6 provided on first end surface 4E of ceramic multilayer body 4 and has a cap shape as an edge of one external electrode 28 extends over a portion of first main surface 4A, a portion of second main surface 4B, a portion of first side surface 4C, and a portion of second side surface 4D of ceramic multilayer body 4. The other external electrode 28 is provided on insulating layer 6 provided on second end surface 4F of ceramic multilayer body 4 and has a cap shape as an edge of the other external electrode 28 extends over a portion of first main surface 4A, a portion of second main surface 4B, a portion of first side surface 4C, and a portion of second side surface 4D of ceramic multilayer body 4.

External electrode 28 also has a three-layered structure preferably including an underlying external electrode layer 29 mainly composed of Cu, a first plated layer 30 mainly composed of Ni, and a second plated layer 31 mainly composed of Sn, for example, similarly to external electrode 8 of multilayer ceramic capacitor 100. Underlying external electrode layer 29 is two-dimensionally electrically connected to portion 5a of conductor layer 5 that extends to first main surface 4A and portion 5b of conductor layer 5 that extends to second main surface 4B.

In multilayer ceramic capacitor 200 according to the second preferred embodiment, conductor layer 5 includes portion 5a that extends to first main surface 4A of ceramic multilayer body 4 and portion 5b that extends to second main surface 4B thereof. Therefore, joint strength between ceramic multilayer body 4 and conductor layer 5 is improved.

In multilayer ceramic capacitor 200, external electrode 28 is two-dimensionally electrically connected to conductor layer 5 at two locations of portion 5a of conductor layer 5 that extends to first main surface 4A and portion 5b of conductor layer 5 that extends to second main surface 4B. Therefore, reliability in electrical connection between external electrode 28 and conductor layer 5 is improved.

In multilayer ceramic capacitor 200, conductor layer 5 that covers first end surface 4E of ceramic multilayer body 4 to which first internal electrode 2 extends and second end surface 4F of ceramic multilayer body 4 to which second internal electrode 3 extends is covered with insulating layer 6. Therefore, the multilayer ceramic capacitor has high moisture resistance.

Multilayer ceramic capacitors 100 and 200 according to the first and second preferred embodiments are described above. The present invention, however, is not limited to the features and elements described above, and can variously be modified in accordance with the gist of the present invention.

For example, although external electrode 8 is provided on first main surface 4A of ceramic multilayer body 4 in multilayer ceramic capacitor 100, external electrode 8 may additionally be provided on second main surface 4B of ceramic multilayer body 4. In this case, not only first main surface 4A of ceramic multilayer body 4 but also second main surface 4B can define and function as a mount surface of multilayer ceramic capacitor 100.

In an exemplary method of manufacturing multilayer ceramic capacitor 100, in order to form conductor layer 5 and insulating layer 6 on first end surface 4E and second end surface 4F of ceramic multilayer body 4, a ceramic green sheet to which one main surface a conductive paste has been applied is bonded. Any method, however, can be used as a method of forming conductor layer 5 and insulating layer 6, and instead of the method above, a conductive sheet may be bonded to each of first end surface 54E and second end surface 54F of unfired ceramic multilayer body 54 and a ceramic green sheet may be bonded onto the conducive sheet. The conductive sheet is preferably made, for example, by applying slurry made by mixing metal powders (Ni powders or the like), a binder resin, and a solvent in a wet process onto a substrate (a carrier film or the like) and drying the slurry.

In an exemplary method of manufacturing multilayer ceramic capacitor 100, unfired ceramic multilayer body 54 is subjected to a barrel treatment to form extending portion 55a of conductive paste 55 on first main surface 54A of unfired ceramic multilayer body 54 and extending portion 55b of conductive paste 55 on second main surface 54B by extending conductive paste 55 for forming conductor layer 5. The method of forming portions 55a and 55b, however, is not limited to barrel treatment. Pressure may be applied by a roller onto a surface of ceramic green sheet 56 bonded to each of first end surface 54E and second end surface 54F of ceramic multilayer body 54.

Although side-surface insulating layer 7 is provided on first side surface 4C and second side surface 4D of ceramic multilayer body 4 in multilayer ceramic capacitor 100 or 200, side-surface insulating layer 7 does not have to be provided when the side portions of first internal electrode 2 and second internal electrode 3 are not exposed at first side surface 4C and second side surface 4D of ceramic multilayer body 4.

Multilayer ceramic capacitors according to preferred embodiments of the present invention of the present application are as described in the "SUMMARY OF THE INVENTION".

In a multilayer ceramic capacitor according to a preferred embodiment of the present invention, it is also preferable that a dimension in the length direction of the portion of the conductor layer that extends to the main surface is not smaller than about 2 μm, for example. When the extending portion has a length not smaller than about 2 μm, joint strength between the conductor layer and the ceramic multilayer body can be improved. When the extending portion has a length not smaller than about 2 μm, reliability of electrical connection between the conductor layer and the external electrode can be improved.

It is also preferable that the conductor layer or the insulating layer includes ceramics. In this case, joint strength between the ceramic multilayer body and the conductor layer or strength of joint between the conductor layer and the insulating layer can be improved.

It is also preferable that a content of ceramics in the conductor layer is not higher than about 20 wt %, for example. In this case, electrical connection between the internal electrode and the conductor layer can be maintained. A portion of the conductor layer that extends to the main surface of the ceramic multilayer body can be provided. The portion of the conductor layer that extends to the main surface of the ceramic multilayer body is provided when the content of ceramics in the conductor layer is not higher than about 20 wt %. When the content of ceramics in the conductor layer exceeds about 20 wt %, the portion of the conductor layer that extends to the main surface of the ceramic multilayer body is less likely to be provided.

It is also preferable that the internal electrode has a thickness not larger than about 1 μm, for example. In this case, the multilayer ceramic capacitor can have smaller dimensions. When the dimension of the multilayer ceramic capacitor is the same, the number of internal electrodes can be increased and thus a capacitance can be higher.

It is also preferable that the external electrode is rectangular or substantially rectangular when viewed in the height direction and covers a portion of at least one of the main surfaces. In this case, the external electrode is not provided on the end surface nor the side surface of the multilayer ceramic capacitor. Therefore, the multilayer ceramic capacitor can be mounted in proximity to another electronic component.

Alternatively, it is also preferable that the external electrode covers the insulating layer, a portion of both of the main surfaces, and a portion of both of the side surfaces. Namely, it is also preferable that the external electrode has a cap shape.

The internal electrode and the conductor layer preferably include a metal component of the same type. In this case, during firing, a difference in temperature for sintering a metal included in the conductor layer and the internal electrode is smaller. Therefore, the internal electrode and the conductor layer can be electrically connected to each other. For example, both of the internal electrode and the conductor layer preferably include Ni or an Ni alloy, for example.

It is also preferable that the side-surface insulating layer is provided on the side surfaces of the ceramic multilayer body. In this case, the internal electrode can have larger dimensions in the width direction and the multilayer ceramic capacitor can have an increased capacitance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a ceramic multilayer body including a plurality of ceramic layers and a plurality of internal electrodes that are layered, the ceramic multilayer body including a pair of main surfaces opposed to each other in a height direction, a pair of side surfaces opposed to each other in a width direction orthogonal or substantially orthogonal to the height direction, and a pair of end surfaces opposed to each other in a length direction orthogonal or substantially orthogonal to both of the height direction and the width direction;
   a conductor layer covering each of the end surfaces of the ceramic multilayer body and electrically connected to the internal electrodes;
   an insulating layer disposed on each of the end surfaces of the ceramic multilayer body and completely covering the conductor layer on the end surfaces; and
   an external electrode electrically connected to the conductor layer; wherein
   the conductor layer extends to a portion of each of the main surfaces of the ceramic multilayer body;
   a portion of each of the main surfaces of the ceramic multilayer body is exposed from each of the insulating layer and the external electrode; and
   each of the insulating layer and the conductor layer is completely covered by the external electrode on at least one of the surfaces of the multilayer body on which the external electrode is disposed.

2. The multilayer ceramic capacitor according to claim 1, wherein a dimension in the length direction of a portion of the conductor layer that extends to each of the main surfaces is equal to or larger than about 2 μm.

3. The multilayer ceramic capacitor according to claim 1, wherein the insulating layer includes ceramics.

4. The multilayer ceramic capacitor according to claim 1, wherein the conductor layer includes ceramics.

5. The multilayer ceramic capacitor according to claim 4, wherein a content of the ceramics in the conductor layer is equal to or lower than about 20 wt %.

6. The multilayer ceramic capacitor according to claim 1, wherein the plurality of internal electrodes each have a thickness equal to or smaller than about 1 μm.

7. The multilayer ceramic capacitor according to claim 1, wherein the external electrode is rectangular or substantially rectangular when viewed in the height direction and covers a portion of at least one of the main surfaces.

8. The multilayer ceramic capacitor according to claim 1, wherein the external electrode covers the insulating layer, a portion of both of the main surfaces, and a portion of both of the side surfaces.

9. The multilayer ceramic capacitor according to claim 1, wherein the internal electrode and the conductor layer include a same metal component.

10. The multilayer ceramic capacitor according to claim 9, wherein the same metal component is Ni or an Ni alloy.

11. The multilayer ceramic capacitor according to claim 1, wherein a side-surface insulating layer is provided on each of the side surfaces of the ceramic multilayer body.

12. The multilayer ceramic capacitor according to claim 1, wherein each of the plurality of ceramic layers has a thickness of not smaller than about 0.3 μm and not larger than about 2.0 μm.

13. The multilayer ceramic capacitor according to claim 1, wherein the plurality of ceramic layers include $BaTiO_3$ as a main component.

14. The multilayer ceramic capacitor according to claim 1, wherein the plurality of internal electrodes each have a thickness equal to or smaller than about 10 μm.

15. The multilayer ceramic capacitor according to claim 1, wherein the conductor layer has a thickness of not smaller than about 3 μm and not larger than about 10 μm.

16. The multilayer ceramic capacitor according to claim 1, wherein the insulating layer and the plurality of ceramic layers include a same material.

17. The multilayer ceramic capacitor according to claim 1, wherein the insulating layers has a thickness of not smaller than about 5 μm and not larger than about 30 μm.

18. The multilayer ceramic capacitor according to claim 1, wherein the external electrode includes an underlying external electrode layer, a first plated layer, and a second plated layer.

19. The multilayer ceramic capacitor according to claim 18, wherein the underlying external electrode layer includes Cu as a main component, the first plating layer includes Ni as a main component, and the second plating layer includes Sn as a main component.

20. The multilayer ceramic capacitor according to claim 19, wherein the underlying external electrode layer includes glass.

* * * * *